Patented Dec. 19, 1933

1,939,951

UNITED STATES PATENT OFFICE 1,939,951

SEED DISINFECTION

Guy H. Buchanan, Westfield, N. J., and William Moore, Chappaqua, N. Y., assignors to American Cyanamid Company, New York, N. Y., a corporation of Maine No Drawing. Application June 26, 1929
Serial No. 373,942

18 Claims. (Cl. 167—38)

This invention relates to seed disinfection and includes, more particularly, those seed disinfectants which are applied in dust or powder form.

The majority of seeds carry, adhering to the seed coat or just inside of the seed coat, the spores of certain fungi. When the seeds are planted these spores may germinate and the subsequent fungus growth may attack the young seedling plant. This attack may result in a rotting of the roots or the stem, and finally in the death of the plant. In some cases, the growing plant may not even break through the ground before it is killed by the fungus. In any even, such diseases cause a reduction in the stand of various farm products with consequent loss in production.

Several methods have been devised in the past to disinfect seeds and kill these fungus spores. Certain toxic dust materials have been suggested for use, fumigation with various substances has been tried, and various solutions have been applied to seeds in an effort to reduce the losses due to the various diseases. Substantially all of these methods and substances have not been as successful as might be desired and are open to serious objections to their use. If the materials attack the seed itself or if they are not correctly applied, the seed may be injured with a reduction in germination. Furthermore, the wet treatment of seed is inconvenient and requires, in addition, a drying operation which is costly and otherwise undesirable.

We have found that a series of organic dithiophosphoric acids or their salts are excellently adapted for use as dusting disinfectants for combatting seed diseases. The dithiophosphoric acids from which the salts are prepared have most probably the following structural formula:

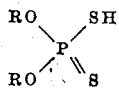

in which R represents an organic radical such as alkyl or aryl. The acids, in accordance with chemical nomenclature, may be considered as the dithiophosphates of hydrogen.

The disinfectants forming a part of the present invention may be prepared in any suitable manner, the following method of making diethyl phosphoric acid and lead diethyl dithiophosphate being given merely by way of illustration and not in limitation:

The organic dithiophosphates, generally, may be prepared by the reaction of phosphorus pentasulphide with the corresponding alcohol or alcoholic body. Thus, to prepare diethyl dithiophosphoric acid, we react upon 208 lbs. of anhydrous ethyl alcohol with 248 lbs. of phosphorous pentasulphide (91% $P_2S_5$) crushed to pass a four-mesh screen. The reaction is preferably carried out in a glass-lined kettle provided with an aluminum reflux condenser. The alcohol is charged into the kettle, heated to about 35° C. and the phosphorous pentasulphide is added slowly through a suitable feed pipe or the like.

Since the reaction is exothermic, care is used to add the phosphorous pentasulphide at such a rate as to prevent undue rise in temperature, cooling means being used if necessary. The temperature is kept below 85° C. and preferably around 45° C. during the mixing of the ingredients which ordinarily covers a period of about 1½ hours. The temperature of the mix is then raised to about 85° C. and maintained at about that point for two to three hours after which the products are allowed to cool and the diethyl dithiophosphoric acid is removed. The crude acid obtained weighs over 400 lbs. and contains about 88% pure acid.

Having prepared the crude diethyl dithiophosphoric acid as described, any desired quantity of the acid is neutralized with a soda ash solution of approximately 20% strength. If desired, a small amount of a decolorizing carbon may be added to the solution which is then filtered. The filtrate is agitated with an excess of lead carbonate in order to remove any sulphides which may be present therein. The solution is again filtered and a sample thereof is analyzed to determine the amount of acid in solution. There is then added to the acid solution a solution of lead nitrate containing an amount of the lead nitrate substantially equivalent to the weight of the acid in solution. The addition of the lead nitrate to the acid results in the formation of a buff-colored pasty precipitate of crude lead diethyl dithiophosphate from which the supernatant liquor readily separates and may be poured off. The pasty mass, after standing, becomes brittle after which it may be ground with alcohol, filtered and washed with more alcohol and then dried in vacuo at 40° C., thereafter being ground again to the state of a fine powder. A purer initial product is obtained if a small amount of lead nitrate is first added, discarding the precipitate, and then adding the rest of the nitrate to form the lead salt.

The lead diethyl dithiophosphate is then mixed in any suitable manner with talc, the latter ingredient forming about 90% of the mixture. In demonstrating the efficacy of this material, corn seed known to be infected with the diseases Gibberella and Diplodia were germinated between layers of moist blotting paper. When the seeds were not treated, fungus made rapid growth on the seeds. However, when the seeds were dusted prior to germination, fungus growth was reduced, or entirely eliminated.

In a second series of experiments, treated and untreated seeds infected with the two above named diseases were planted in boxes of soil in a greenhouse and were allowed to grow until the plants had obtained a height of about 4 inches. This covered a period of about fourteen days. The plants were then removed from the soil and roots and stems were examined for evidence of disease. The results obtained were comparable with those obtained in tests extending over much longer periods of time.

The following data obtained from these tests illustrates the effect of the lead diethyl dithiophosphate on corn infected with the two diseases mentioned as compared with untreated seed.

|  | Percent germination | Percent diseased | |
| --- | --- | --- | --- |
|  |  | Gibberella | Diplodia |
| No treatment | 86 | 44 | 36 |
| 10% lead diethyl dithiophosphate 90% talc | 92 | 6 | 7 |

In order to determine the effect of this composition upon germination, seeds known to be free of disease were treated with the composition, planted in soil and the germination noted. Comparing the results with those obtained with untreated disease-free seeds, we found that the disinfectant not only controlled the diseased seeds but also improved the germination of the disease-free seeds.

We have further found that by adding small amounts of certain mercury compounds to the mixture of dithiophosphate and talc, the disinfecting properties are even superior to the dithiophosphates when used alone. Among the compounds which we have found suitable are mercuric cyanide and mercuric chloride. Ordinarily, the amount of mercuric compound which may be added will vary from about 1 to 10% of the total composition.

In place of talc, other fillers or spreading materials may be used such as pumice, bentonite, kieselguhr, fuller's earth, etc. Other substances may be used with or in place of the mercury compounds previously described. For instance, in making up our compositions we may use trisodium phosphate, sodium nitrate, sodium chloride, cuprous cyanide, and the like, or mixtures of the same.

In general we have found that the heavy metal salts of the organic dithiophosphoric acids are particularly adapted for use in our invention. These materials are all substantially water insoluble or only slightly soluble. Of the salts which we have found to be particularly valuable may be mentioned those of lead, zinc, mercury and copper. These toxic metal salts may be prepared as described or in any other suitable manner from suitable organic dithiophosphoric acids.

We have also found that salts of the organic dithiophosphoric acids other than those of the heavy metals mentioned may be considered as falling within the group of toxic metal salts. Of these may be mentioned the sodium, potassium, ammonium and alkali earth metal salts. We may also use the organic salts, such as of aniline and the like. In some cases we have found it desirable to use the acids themselves, either alone or in admixture with the salts. The acids are ordinarily liquids but may be absorbed on some carrier such as pumice, talc or the like to make a powder.

While we have mentioned only the ethyl dithiophosphoric acid, we may use diphenyl-, dicresyl-, dinaphthyl-, diamyl-, dibutyl-, dipropyl- dithiophosphoric acid and the like, in the preparation of our seed disinfectants. If desired we may use mixtures of these acids or the salts thereof.

The following additional examples illustrate some of the variations which may be made in the formulas of our seed disinfectants:

Example 1

| | Percent |
| --- | --- |
| Lead diethyl dithiophosphate | 10 |
| Talc | 90 |

Example 2

| | Percent |
| --- | --- |
| Lead diethyl dithiophosphate | 10 |
| Mercuric cyanide | 2.7 |
| Talc | 87.3 |

Example 3

| | Percent |
| --- | --- |
| Lead diethyl dithiophosphate | 10 |
| Mercuric cyanide | 5.4 |
| Talc | 84.6 |

Example 4

| | Percent |
| --- | --- |
| Lead diethyl dithiophosphate | 10 |
| Mercuric cyanide | 8.2 |
| Talc | 81.8 |

Example 5

| | Percent |
| --- | --- |
| Lead diethyl dithiophosphate | 10 |
| Mercuric chloride | 5.4 |
| Talc | 84.6 |

Example 6

| | Percent |
| --- | --- |
| Lead diethyl dithiophosphate | 10 |
| Sodium nitrate | 10 |
| Talc | 80 |

Example 7

| | Percent |
| --- | --- |
| Lead diethyl dithiophosphate | 10 |
| Trisodium phosphate | 5 |
| Talc | 85 |

Example 8

| | Percent |
| --- | --- |
| Lead diethyl dithiophosphate | 10 |
| Ammonium diethyl dithiophosphate | 5 |
| Talc | 85 |

Example 9

| | Percent |
| --- | --- |
| Lead diethyl dithiophosphate | 5 |
| Ammonium diethyl dithiophosphate | 5 |
| Talc | 90 |

Example 10

| | Percent |
| --- | --- |
| Lead diethyl dithiophosphate | 10 |
| Sodium chloride | 5 |
| Talc | 85 |

Example 11

| | Percent |
|---|---|
| Lead diethyl dithiophosphate | 10 |
| Cuprous cyanide | 5 |
| Talc | 85 |

Example 12

| | Percent |
|---|---|
| Lead diethyl dithiophosphate | 5 |
| Sodium diethyl dithiophosphate | 5 |
| Talc | 90 |

Example 13

| | Percent |
|---|---|
| Ammonium diethyl dithiophosphate | 5 |
| Talc | 95 |

Example 14

| | Percent |
|---|---|
| Zinc diethyl dithiophosphate | 5 |
| Ammonia diethyl dithiophosphate | 5 |
| Talc | 90 |

Example 15

| | Percent |
|---|---|
| Sodium diethyl dithiophosphate | 5 |
| Talc | 95 |

Example 16

| | Percent |
|---|---|
| Cuprous diethyl dithiophosphate | 10 |
| Talc | 90 |

Example 17

| | Per cent |
|---|---|
| Mercuric diethyl dithiophosphate | 15 |
| Talc | 85 |

Example 18

| | Per cent |
|---|---|
| Mercuric diphenyl dithiophosphate | 20 |
| Talc | 80 |

Example 19

| | Per cent |
|---|---|
| Zinc diphenyl dithiophosphate | 20 |
| Talc | 80 |

Example 20

| | Per cent |
|---|---|
| Lead diphenyl dithiophosphate | 13 |
| Talc | 87 |

Under certain circumstances it is found more desirable and economical to apply our disinfectants in the form of solutions or suspensions in water. For instance, in treating seed potatoes, we may make up a heavy suspension of one of our disinfecting compositions, or a solution of such material as is soluble. The potatoes or the like are treated by immersing them in the suspension or solution and subsequently drying.

It is to be understood that other variations may be made in details of the invention without departing from the spirit or scope thereof except as defined in the appended claims.

We claim:

1. A process of disinfecting seeds which comprises treating the seeds with a composition containing an organic dithiophosphate.

2. A process of disinfecting seeds which comprises treating the seeds with a composition containing a salt of an organic dithiophosphoric acid.

3. A process of disinfecting seeds which comprises treating the seeds with a composition containing a heavy metal salt of an organic dithiophosphoric acid.

4. A process of disinfecting seeds which comprises treating the seeds with a composition containing a substantially water insoluble salt of an organic dithiophosphoric acid.

5. A process of disinfecting seeds which comprises treating the seeds with a composition containing a toxic metal salt of an organic dithiophosphoric acid.

6. A process of disinfecting seeds which comprises treating the seeds with a composition containing a lead salt of an organic dithiophosphoric acid.

7. A process of disinfecting seeds which comprises treating the seeds with a composition containing a lead salt of diethyl dithiophosphoric acid.

8. A seed disinfectant comprising an organic dithiophosphate having the property of destroying fungus diseases of seeds.

9. A seed disinfectant comprising a salt of an organic dithiophosphoric acid having the property of destroying fungus diseases of seeds.

10. A seed disinfectant comprising a heavy metal salt of an organic dithiophosphoric acid having the property of destroying fungus diseases of seeds.

11. A seed disinfectant comprising a substantially water insoluble salt of an organic dithiophosphoric acid having the property of destroying fungus diseases of seeds.

12. A seed disinfectant comprising a toxic metal salt of an organic dithiophosphoric acid having the property of destroying fungus diseases of seeds.

13. A seed disinfectant comprising a lead salt of an organic dithiophosphoric acid having the property of destroying fungus diseases of seeds.

14. A seed disinfectant comprising a lead salt of diethyl dithiophosphoric acid having the property of destroying fungus diseases of seeds.

15. A seed disinfectant comprising an organic dithiophosphate and mercuric cyanide.

16. A seed disinfectant comprising a lead salt of an organic dithiophosphoric acid and mercuric cyanide.

17. A process of disinfecting seeds which comprises treating the seeds with a composition containing an organic dithiophosphate and mercuric cyanide.

18. A process of disinfecting seeds which comprises treating the seeds with a composition containing a lead salt of an organic dithiophosphoric acid and mercuric cyanide.

GUY H. BUCHANAN.
WILLIAM MOORE.